United States Patent
Kim et al.

(10) Patent No.: US 9,794,671 B2
(45) Date of Patent: Oct. 17, 2017

(54) REPURPOSABLE MICROPHONE AND SPEAKER

(71) Applicant: EMPIRE TECHNOLOGY DEVELOPMENT LLC, Wilmington (DE)

(72) Inventors: Seungil Kim, Seoul (KR); Youngil Ko, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 15/110,466

(22) PCT Filed: Jan. 9, 2014

(86) PCT No.: PCT/US2014/010924
§ 371 (c)(1),
(2) Date: Jul. 8, 2016

(87) PCT Pub. No.: WO2015/105497
PCT Pub. Date: Jul. 16, 2015

(65) Prior Publication Data
US 2016/0337744 A1    Nov. 17, 2016

(51) Int. Cl.
| | |
|---|---|
| *H04R 1/10* | (2006.01) |
| *H04R 1/08* | (2006.01) |
| *H04R 3/04* | (2006.01) |
| *H04M 1/60* | (2006.01) |
| *H04M 1/725* | (2006.01) |

(52) U.S. Cl.
CPC ........ *H04R 1/1041* (2013.01); *H04M 1/6033* (2013.01); *H04M 1/6058* (2013.01); *H04M 1/72527* (2013.01); *H04R 1/08* (2013.01); *H04R 1/1033* (2013.01); *H04R 1/1091* (2013.01); *H04R 3/04* (2013.01); *H04R 2400/01* (2013.01); *H04R 2420/07* (2013.01)

(58) Field of Classification Search
None
See application file for complete search history.

(56) References Cited

U.S. PATENT DOCUMENTS

| 6,185,627 B1 | 2/2001 | Baker et al. |
|---|---|---|
| 7,890,284 B2 | 2/2011 | Patterson et al. |
| 8,280,066 B2 | 10/2012 | Joho et al. |
| 2003/0009108 A1 | 1/2003 | Kawaguchi |
| 2004/0136543 A1 | 7/2004 | White et al. |
| 2007/0003094 A1 | 1/2007 | Chen |

(Continued)

OTHER PUBLICATIONS

"Can Headphones be Used a Microphone When Plugged into the Microphone Jack on a Computer?", Retrieved on Jul. 12, 2012 from the Internet at URL <http://www.answers.com/Q/Can_headphones_be_used_a_microphone_when_plugged_into_the_microphone_jack_on_a_computer>, pp. 2.

(Continued)

*Primary Examiner* — Curtis Kuntz
*Assistant Examiner* — Kenny Truong
(74) *Attorney, Agent, or Firm* — Turk IP Law, LLC

(57) ABSTRACT

Technologies including methods, devices, systems and computer readable media related repurposing a speaker to operate as a microphone and/or repurposing a microphone to operate as a speaker.

17 Claims, 8 Drawing Sheets

(56) References Cited

U.S. PATENT DOCUMENTS

| | | |
|---|---|---|
| 2007/0133442 A1 | 6/2007 | Masuda et al. |
| 2009/0209304 A1* | 8/2009 | Ngia .................... H04R 1/1091 455/575.2 |
| 2010/0128887 A1 | 5/2010 | Lee et al. |
| 2013/0116014 A1 | 5/2013 | Johnson et al. |
| 2013/0170665 A1 | 7/2013 | Wise et al. |

OTHER PUBLICATIONS

"Listen to This: Using Earphones As Mikes", Retrieved on Apr. 7, 2016 from the Internet at URL <https://web.archive.org/web/20090731145736/http://www.masternewmedia.org/news/2005/04/04/listen_to_this_using_earphones.htm>, posted on Apr. 4, 2005, pp. 5.

International Search Report and Written Opinion of the International Searching Authority, International application No. PCT/US14/10924, May 22, 2014.

* cited by examiner

500 —

DETERMINE AT LEAST ONE OF A RIGHT EARPIECE OR A LEFT EARPIECE OF
A SET OF EARPHONES IS TO BE CONFIGURED TO FUNCTION AS A
MICROPHONE
502

PROVIDE AN INDICATION THAT AT LEAST ONE OF THE RIGHT EARPIECE OR
THE LEFT EARPIECE IS TO BE REPURPOSED AS A MICROPHONE
504

REPURPOSE AT LEAST ONE OF THE RIGHT EARPIECE OR THE LEFT
EARPIECE AS A MICROPHONE BASED ON THE INDICATION
506

FIG. 5A

600 A COMPUTER PROGRAM PRODUCT

602 A SIGNAL BEARING MEDIUM

604 AT LEAST ONE OF

A machine readable non-transitory medium having stored therein instructions that, in response to execution, cause a device to repurpose a dual-operation earpiece by:
    monitoring sensor data associated with the earpiece;
    detecting a repurpose event based on the monitored sensor data;
    determining whether the earpiece is to be repurposed as a microphone, based on the detected repurpose event; and
    configuring the earpiece to operate as the microphone, based on the determination.

| 606 A COMPUTER READABLE MEDIUM | 608 A RECORDABLE MEDIUM | 610 A COMMUNICATIONS MEDIUM |

FIG. 6

REPURPOSABLE MICROPHONE AND SPEAKER

CROSS REFERENCE TO RELATED APPLICATION

The present application is a U.S. National Stage filing under 35 U.S.C. §371 of International Application No. PCT/US2014/010924, filed on Jan. 9, 2014 and entitled "REPURPOSABLE MICROPHONE AND SPEAKER." International Application No. PCT/US2014/010924, including any appendices or attachments thereof, is hereby incorporated by reference in its entirety.

BACKGROUND

Unless otherwise indicated herein, the materials described in this section are not prior art to the claims in this application and are not admitted to be prior art by inclusion in this section.

Many users use earphones for listening to music or watching videos. Mobile communication devices are often equipped with a call function unlike multimedia players. During a call, incoming audio may be output through earphones. Inconveniently, outgoing audio may be transmitted during the call using a separate microphone built into the mobile communication device.

SUMMARY

A method for a device to provide a microphone capability at earphones comprises determining in response to an event associated with the microphone capability that at least one of a first earpiece or a second earpiece of the earphones is to be configured to provide the microphone capability. The method further comprises repurposing the at least one of the first earpiece or the second earpiece as a microphone based at least in part on the determination.

An apparatus comprises a device configured to be coupled to audio earphones, and a microphone detector of the device. The microphone detector is configured to determine whether at least one of a first earpiece or a second earpiece of the earphones is to be configured to provide a microphone capability, in response to an event associated with the microphone capability and provide an indication that at least one of the first earpiece or the second earpiece is to be repurposed as a microphone that includes the microphone ability. The device further comprises a repurpose module communicatively coupled to the microphone detector and configured to repurpose at least one of the first earpiece or the second earpiece as the microphone based on the indication.

A machine readable non-transitory medium includes instructions stored therein that, in response to execution, cause a device to repurpose a dual-operation earpiece by monitoring sensor data associated with the earpiece, detecting a repurpose event based on the monitored sensor data, determining whether the earpiece is to be repurposed as a microphone, based on the detected repurpose event, and configuring the earpiece to operate as the microphone, based on the determination.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure, and are therefore, not to be considered limiting of its scope. The disclosure will be described with additional specificity and detail through use of the accompanying drawings.

In the drawings:

FIG. 5A illustrates a process to repurpose a speaker and/or microphone;

FIG. 6 illustrates an example computer program product to repurpose a speaker and/or microphone.

DETAILED DESCRIPTION

Figure 1:
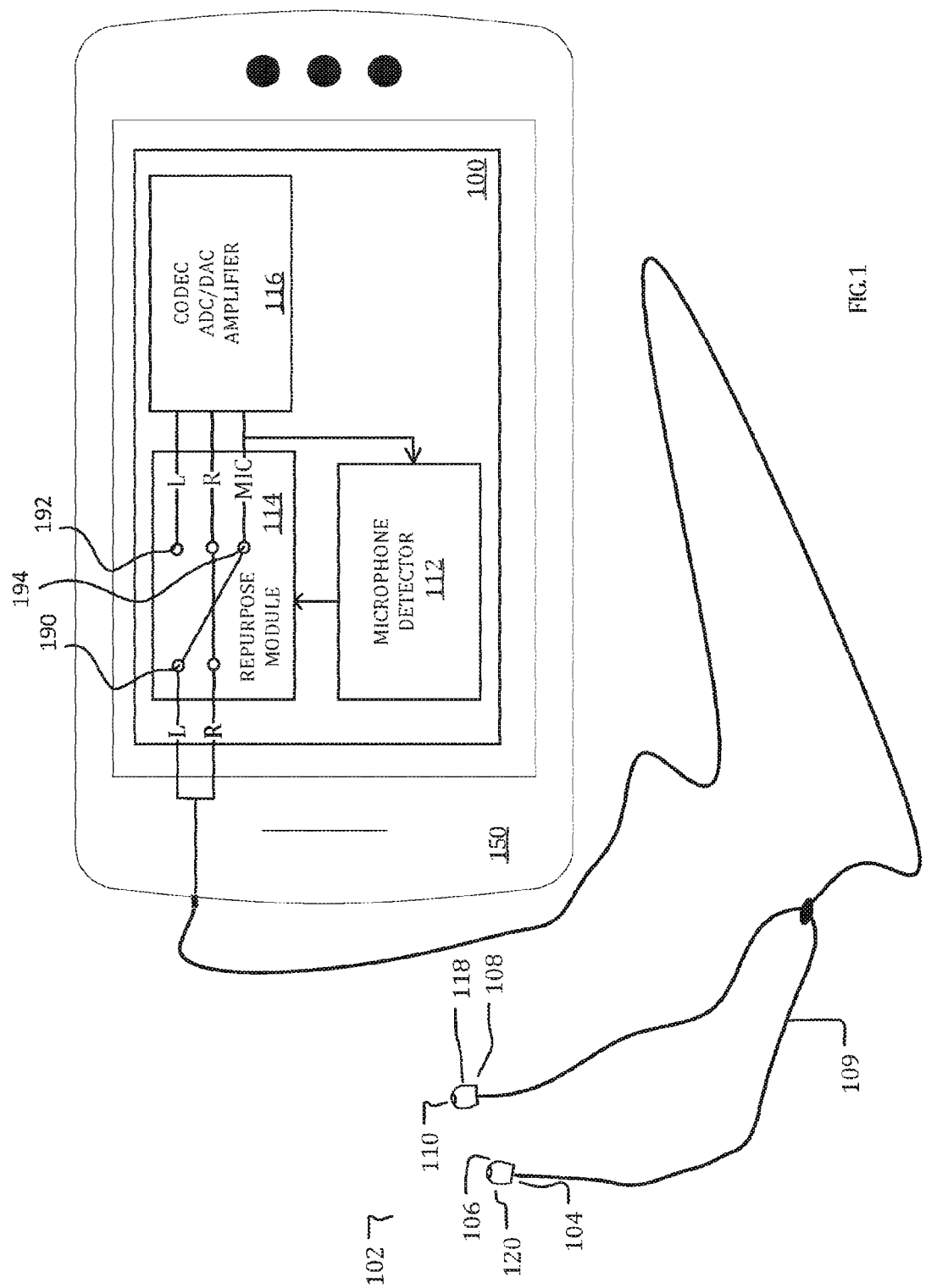
FIG. 1 illustrates an example of a repurposable microphone and speaker.

The following description sets forth various examples along with specific details to provide a thorough understanding of the subject matter. The subject matter may be practiced without some or more of the specific details disclosed herein. Further, in some circumstances, well-known methods, procedures, systems, components and/or circuits have not been described in detail, in order to avoid unnecessarily obscuring the subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the Figures, can be arranged, substituted, combined, and designed in a wide variety of different configurations, all of which are explicitly contemplated and made part of this disclosure.

This disclosure is drawn, inter alia, to technologies including methods, devices, systems and computer readable media configured to repurpose a speaker to function as a microphone and/or repurpose a microphone to function as a speaker. In one example, a device configured to provide a microphone and/or speaker capability may be coupled to stereo earphones. A microphone detector of the device may be configured to determine at least one of a right earpiece or a left earpiece of the earphones is to be configured to provide a microphone capability in response to an event in which microphone capability may be useful (e.g., a repurpose event/action), and to provide an indication that at least one of the right earpiece or the left earpiece is to be repurposed as the microphone. The device may also comprise a repurpose module communicatively coupled to the microphone detector and configured to repurpose at least one of the right earpiece or the left earpiece as a microphone based on the indication.

FIG. 1 illustrates an example of a repurposable microphone and speaker, and more specifically, FIG. 1 illustrates an example of a device 100 configured to repurpose a speaker to a microphone and/or a microphone to a speaker. Device 100 may be coupled to earphones 102. In an example, device 100 may be an audio chip, ASIC, FPGA, electronic circuit, other type of integrated circuit, and/or any other suitable hardware and/or software module(s) or combination thereof. Each of earphones 102 may be configured to operate as a speaker and/or microphone. Earphones 102 may comprise first and second earpieces, for example, a left earpiece 104 and a right earpiece 108 (or vice versa). Right earpiece 108 may comprise right speaker 110 and/or right microphone 118. Right speaker 110 and/or right microphone 118 may comprise separate components, the same components or may share some components. Left earpiece 104 may comprise left speaker 106 and/or left microphone 120. Left speaker 106 and/or left microphone 120 may comprise separate components, the same components or may share some components. Earphones 102 may be configured to be held in place in proximity to a user's ears. For example, earphones 102 may be configured to fit within an outer ear canal of a user's ear and/or may be configured to rest on or outside of a user's ear(s) at a distance sufficient to enable to user to hear audio that is output from either or both the left speaker 106 or the right speaker 110.

In an example, earphones 102 may be permanently or removably coupled to device 100 via a connector 109. Connector 109 may comprise a wired and/or a wireless connection. Such wireless connection may be via a short and/or a long range radio frequency communication which may include one or more of: Bluetooth®, Wi-Fi, Institute of Electrical and Electronics Engineers (IEEE) 802.11n, Zigbee (IEEE 802.15), Infrared, WiMax, Wide Area Network (WAN), Ultra Wideband (UWB), Global System for Mobile Communications (GSM), Code Division Multiple Access (CDMA), Wideband Code Division Multiple Access (WCDMA), General Packet Radio Service (GPRS), Universal Mobile Telecommunications System (UNITS), Satellite, Global Positioning System (GPS), and/or others or a combination thereof.

In an example, device 100 may be incorporated within a mobile device 150 configured to communicate wirelessly and that may be configured to be permanently or removably coupled to earphones 102. Mobile device 150 may comprise a personal computer, a radio, a portable media player, a mobile communication device and/or other electronic devices or a combination thereof. In another example, device 100 may be incorporated into earphones 102, or may be a device capable to communicate with earphones 102 separately from and/or together with mobile device 150.

In an example, device 100 may comprise a microphone detector 112, a repurpose module 114 and an amplifier 116. Microphone detector 112 may be disposed inside of device 100. Microphone detector 112 may be compatible with existing device hardware and may be added to an existing device 100 via a software/firmware upgrade requiring little or no additional hardware to be operational. For example, microphone detector 112 may be added to an existing device 100 if designed as re-programmable hardware (e.g., FPGA) or software module. In other embodiments, microphone detector 112 may be specifically provided with or otherwise integrated into device hardware (e.g., hardware for mobile device 150) during the manufacturing and assembly stage of mobile device 150.

In an example, amplifier 116 may be included with a module comprising a codec and/or an analog-to-digital (ADC)/digital-to-analog (DAC) device and or such devices as may enable audio and or video transmissions to and/or from device 100.

Microphone detector 112 may be configured to detect indicia indicating that at least one of left speaker 106 or right speaker 110 is to be repurposed as the corresponding one of left microphone 120 or right microphone 118. The indicia may be associated with an event or action that indicates a user may currently or subsequently elect to use one of left earpiece 104 and/or right earpiece 108 as a microphone. Such an event and/or action may be referred to as a "repurpose event" for the sake of convenience and clarity. A repurpose event may include: a user taking the left earpiece 104 or right earpiece 108 out of the user's ear in anticipation of making or receiving a call, receiving incoming call, making an outgoing call, detecting a typed keyword or number, detecting a voice command or other user input, and/or other activity a combination thereof.

In an example, prior to determining whether at least one of the right earpiece 108 or the left earpiece 104 is to be configured to provide the microphone capability, microphone detector 112 may be configured to determine, in response to the indicia of a repurpose event, whether earphones 102 are coupled to and/or in use by device 100. If earphones 102 are coupled to and/or in use by device 100, microphone detector 112 may then proceed to determine whether at least one of right earpiece 108 or left earpiece 104 is to be reconfigured to provide the microphone capability. However, if earphones 102 are not coupled to and/or in use by device 100, it may not be practical or useful to determine whether one of earphones 102 should be repurposed as a microphone and/or speaker. Thus, microphone detector 112 may refrain from making such determination in response to determining that earphones 102 are not coupled to and/or in use by device 100.

In an example, repurpose module 114 may be communicatively coupled to microphone detector 112. Based on the detected indicia, microphone detector 112 may provide repurpose data to repurpose module 114. The repurpose data may indicate that at least one of left speaker 106 or right speaker 110 is to be repurposed as the corresponding one of left microphone 120 or right microphone 118 or at least one of one of left microphone 120 or right microphone 118 is to be repurposed as the corresponding one of left speaker 106 or right speaker 110. In an example, responsive to the repurpose data, repurpose module 114 may be configured to repurpose at least one of left speaker 106 and/or right speaker 110 to the corresponding one of left microphone 120 and/or right microphone 118 responsive to the indication. In FIG. 1, left speaker 106 as depicted is repurposed to function as left microphone 120. To repurpose left earpiece 104 from left speaker 106 to left microphone 120, responsive to repurpose data, repurpose module 114 may be configured to switch left earpiece input/output (I/O) 190 from a left audio input 192 to microphone output 194. Such repurposing may enable a user to use one of left earpiece 104 as a microphone and right earpiece 108 as a speaker during a call. A user may remove the left earpiece 104 from their ear during the call and speak into left earpiece 104 while leaving right earpiece 108 in the ear to use as the speaker during the call. The user may select either earpiece to use as a microphone. The microphone detector 112 may be configured to detect that either earpiece has been removed and should be repurposed as a microphone. Repurposing at least one of left earpiece 104 and/or right earpiece 108 to function as a microphone or speaker may be convenient prior to or during a two-way radio communication, a phone call and/or a video conference or other communication or combination thereof.

Figure 2:
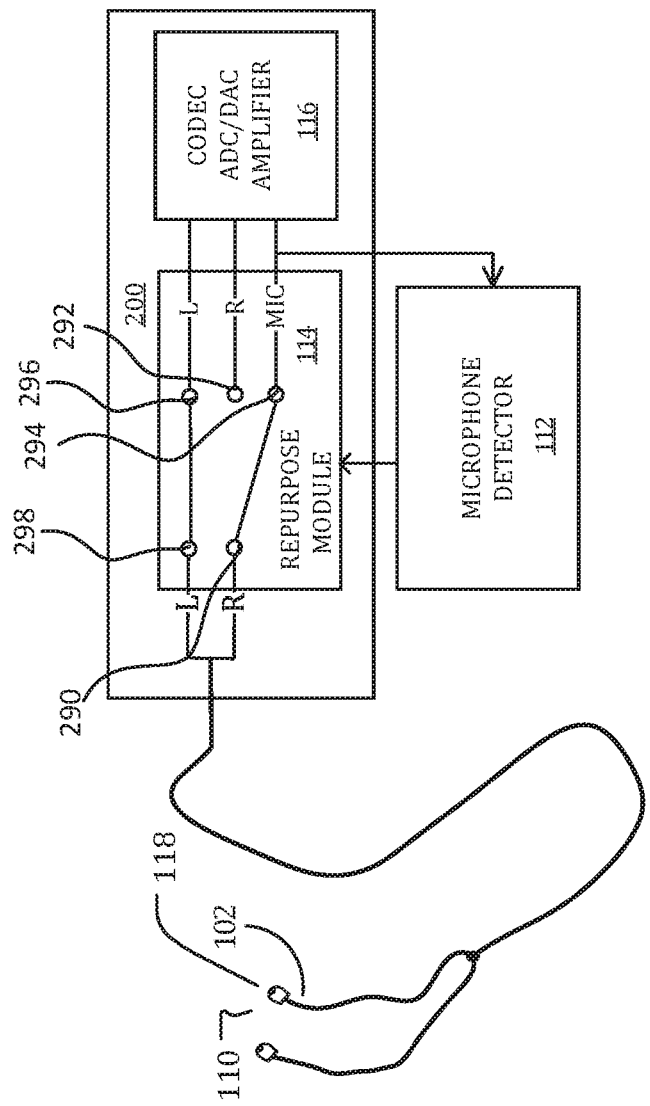
FIG. 2 illustrates an example of a repurposable microphone and speaker.

FIG. 2 illustrates an example of a repurposable microphone and speaker, and more specifically, FIG. 2 illustrates an example of a device 200 configured to repurpose a speaker to a microphone and/or a microphone to a speaker. Device 200 may be coupled to earphones 102. In an example, device 200 may be an audio chip, ASIC, FPGA, electronic circuit, other type of integrated circuit, and/or any other suitable hardware and/or software module(s) or combination thereof. Device 200 may be communicatively coupled to earphones 102 and may be incorporated within a wireless communication device, or may be incorporated into earphones 102, or may be a device capable to communicate with earphones 102 separately from or together with a wireless communication device. In an example, device 200 may comprise microphone detector 112, repurpose module 114 and amplifier 116. In an example, amplifier 116 may be included with a module comprising a codec and/or an analog-to digital (ADC)/digital-to-analog (DAC) device and or such devices as may enable audio and or video transmissions to and/or from device 200.

Microphone detector 112 may be disposed outside of device 200. In an example. Microphone detector 112 may be compatible with the existing hardware of device 200 if implemented outside of device 200. In FIG. 2, right speaker 110 as depicted is repurposed to operate as right microphone 118. Responsive to repurpose data, repurpose module 114 may be configured to switch right earpiece input/output (I/O) line 290 from a right audio input line 292 to microphone output line 294. In an example, right earpiece I/O line 290 and left earpiece I/O line 298 may comprise input/output lines and/or may comprise circuitry, data/signals, software configurations, hardware configurations, and/or others or combinations thereof. Likewise, right audio input line 292 and left audio input line 296 may comprise input/output lines, circuitry, data/signals, software configurations, hardware configurations, and/or others or combinations thereof.

Figure 3:
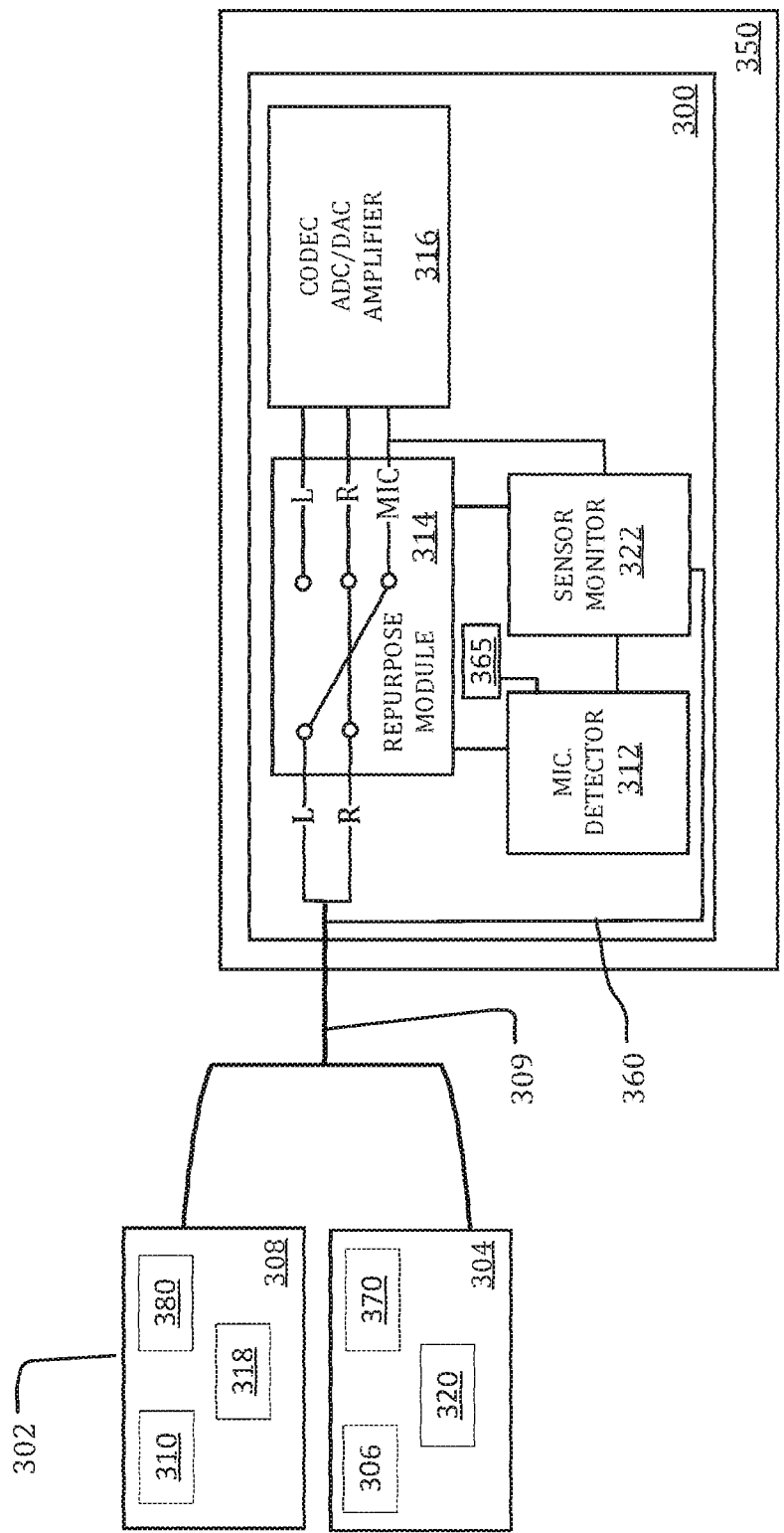
FIG. 3 illustrates an example of a repurposable microphone and speaker.

FIG. 3 illustrates an example of a repurposable microphone and speaker, and more specifically, FIG. 3 illustrates an example of a device 300 configured to repurpose a speaker to a microphone and/or a microphone to a speaker. Device 300 may be coupled to earphones 302. In an example, device 300 may be an audio chip, ASIC, FPGA, electronic circuit, other type of integrated circuit, and/or any other suitable hardware and/or software module(s) or combination thereof. Earphones 302 may comprise a left earpiece 304 and a right earpiece 308. Right earpiece 308 may comprise a right sensor 380, right speaker 310 and/or right microphone 318. Left earpiece 304 may comprise a left sensor 370, left speaker 306 and/or left microphone 320. In an example, earphones 302 may be permanently or removably coupled to device 300 via a connector 309. Device 300 may be incorporated within a wireless communication device 350 such as a radio, a portable media player, a mobile communication device and/or other electronic device or a combination thereof. Device 300 may be incorporated into earphones 302, or may be a device capable to communicate with earphones 102 separately from or together with wireless communication device 350.

In an example, device 300 may comprise a sensor monitor 322, (optionally) a microphone detector 312, a repurpose module 314 and an amplifier 316, all communicatively or otherwise operatively coupled to each other. Sensor monitor 322 may be in communication with repurpose module 314 and/or microphone detector 312. Sensor monitor 322 may be separate from or incorporated within microphone detector 312. If present, microphone detector 312 may be in communication with repurpose module 314.

In an example, right sensor 380 and/or left sensor 370 may comprise one or more sensors to detect motion, heat, sound, light, proximity, touch and/or other physical phenomenon. Right sensor 380 and/or left sensor 370 may comprise at least one of an accelerometer, a thermal sensor, an acoustic sensor, an optical sensor, a light detector, a proximity sensor, a pressure/current sensor, and/or a physical switch or other device/sensor. Such sensors and/or switches may detect indicia of a repurpose event or action corresponding to either of left earpiece 304 or right earpiece 308. As noted previously, a "repurpose event" may be an event or action that indicates the associated earpiece should be repurposed as either a speaker or microphone.

In an example, sensor monitor 322 may be configured to receive and/or otherwise detect sensor data from either of right sensor 380 and/or left sensor 370. Right sensor 380 and/or left sensor 370 may transmit sensor data to sensor monitor 322 via a wired communication line such as communication line 360 and/or via wireless communication such as Bluetooth®.

In an example, sensor monitor 322 may be configured to process sensor data to identify indicia of a repurpose event. Sensor monitor 322 may determine whether at least one of left earpiece 304 and/or right earpiece 308 is to be repurposed as a microphone and/or speaker based at least in part on the processing. Sensor monitor 322 may communicate a repurpose signal to microphone detector 312 and/or repurpose module 314 to repurpose module 314. The signal may indicate whether at least one of left earpiece 304 and/or right earpiece 308 is to be repurposed as a microphone and/or speaker. In another example, microphone detector 312 may be communicatively coupled to sensor monitor 322, right sensor 380 and/or left sensor 370. Microphone detector 312 may analyze sensor data and/or the repurpose signal received from sensor monitor 322, right sensor 380 and/or left sensor 370 to confirm a determination by microphone detector 312 that left earpiece 304 and/or right earpiece 308 is to be repurposed. Such confirmation may be based on a comparison of the sensor data and/or repurpose signal with a prior, contemporaneous and/or future repurpose determination for example, using high-frequency level measurement values as described below with respect to FIG. 4. In an example, microphone detector 312 may confirm a determination to repurpose a left earpiece 304 or right earpiece 308 if the sensor data and/or repurpose signal from sensor monitor 322, right sensor 380 and/or left sensor 370 and the repurpose determination by the microphone detector 312 indicate that a same earpiece is to be repurposed to a same purpose (speaker or microphone). For example, right sensor 380 may be an accelerometer and may be configured to detect sudden uncontrolled movement of right earpiece 308, possibly accompanied by subsequent silence (e.g., an acoustic sensor detecting a lack of voice/audio being input into right earpiece 308), which may indicate that earpiece has probably accidentally fallen out of a user's ear rather than being removed voluntarily. Based on such accelerometer sensor data (and/or other sensor data) and/or a repurpose signal based on accelerometer values (and/or based on other sensor values), microphone detector 312, repurpose module 314 and/or sensor monitor 322 may determine that a repurpose event has not occurred.

In another example, right sensor 380 may be a pressure and/or current sensor and may be configured to detect when an earpiece, such as right earpiece 308 is no longer in contact with the skin of a user's ear. Other sensors associated with earpiece 308 may be configured to detect sound and/or movement accompanying detection of loss of contact with the skin. Thus, it may be determined that earpiece 308 has been voluntarily removed from a user's ear. For example, movement may be detected by an accelerometer sensor detecting a movement of right earpiece 308 while being removed from the user's ear. Sound may be detected by an acoustic sensor detecting voice/audio being input into right earpiece 308. Data from the pressure and/or current sensor, the accelerometer sensor and/or the acoustic sensor may indicate that earpiece has probably been intentionally removed from a user's ear rather than involuntarily falling out of the user's ear. Based on such pressure and/or current sensor data (and/or other sensor data) and/or a repurpose signal based on pressure and/or current values (and/or based on other sensor values), microphone detector 312, repurpose module 314 and/or sensor monitor 322 may determine that a repurpose event has occurred.

In an example, the repurpose determination and sensor data and/or repurpose signal may be compared in a table and or otherwise mapped for comparison. The table and/or map may be stored in microphone detector 312, sensor monitor 322 and/or in a database 365 or other suitable storage unit, for example. Microphone detector 312 may be configured to send repurpose data to repurpose module 314 based in part on the confirmation. Repurpose module 314 may repurpose at least one of left earpiece 304 and/or right earpiece 308 based on the confirmed repurpose data.

In another example, repurpose module 314 may be configured to compare the sensor data and/or repurpose signal received from sensor monitor 322 to repurpose data received from microphone detector 312 to confirm the repurpose determination. Repurpose module 314 may proceed to repurpose at least one of left earpiece 304 and/or right earpiece 308 based on the confirmed repurpose data.

Figure 4:
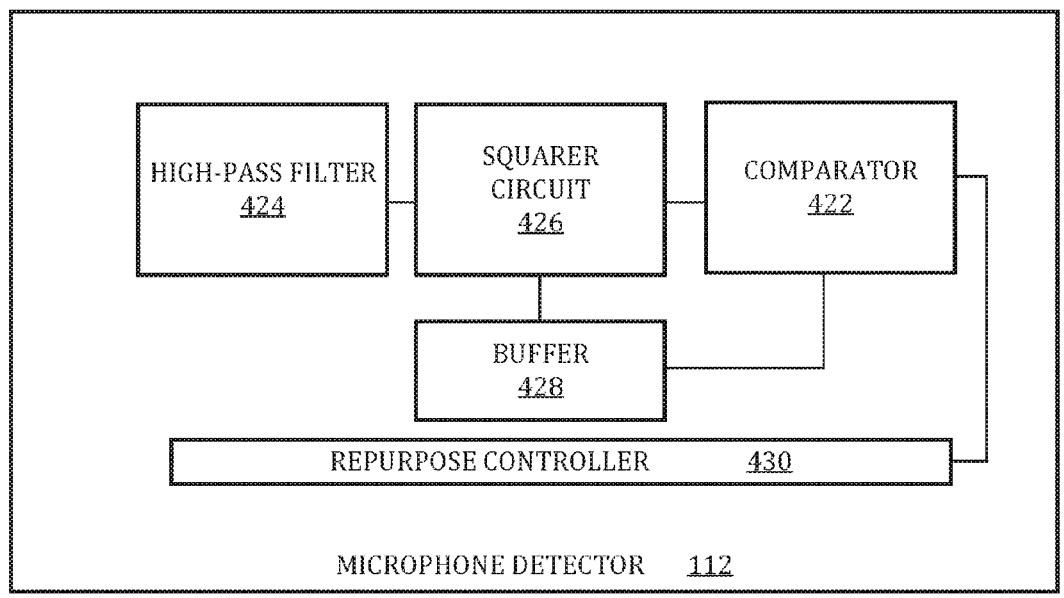
FIG. 4 illustrates an example of a microphone detector.

FIG. 4 illustrates an example of a microphone detector, and more specifically, FIG. 4 illustrates an example of a microphone detector 112. As previously noted, microphone detector 112 may be configured to detect indicia that indicate at least one of left earpiece 104 and/or right earpiece 108 is to be repurposed as a microphone and/or speaker. In an example, microphone detector 112 may be configured to test left earpiece 104 and/or right earpiece 108 to detect indicia of one or more events and/or actions in which at least one of left earpiece 104 or right earpiece 108 may be intended for use as a microphone rather than a speaker or vice versa. Such a test may be run periodically, continuously, randomly, repeatedly, and/or may be triggered by an event or action.

In an example, events that may be recognized by device 100 and that may trigger such a test may include, manual activation by a user, movement of one or more earphones 102, initiation of a communication, receipt of an incoming communication, accepting a call, ending a communication, ending a call, connecting earphones 102, interruption of a current communication including audio and/or video, keyword recognition and/or others and combinations thereof.

In an example, microphone detector 112 may be configured to measure sound such as high-frequency level sound received by either microphone of left earpiece 104 and/or right earpiece 108. In an example, low-frequency sound may be able to pass through earphones 102 and may be easily detectable by microphone detector 112 while left earpiece 104 and/or right earpiece 108 are disposed in a user's ears. High-frequency sound may not be able to pass through earphones 102 as easily as low-frequency sound and may be more difficult to detect by microphone detector 112 than low-frequency sound because high-frequency sound may be less able to pass through left earpiece 104 and/or right earpiece 108 while a user is wearing earphones 102. Therefore, a high-frequency level sound measured at an earpiece that is no longer disposed in a user's ear may be significantly higher than a high-frequency level measured at an earpiece positioned in or near a user's ear. Thus, because earphones 102 may be a sound obstacle and may be more of an obstacle to high-frequency level sound than to low-frequency level sound, high-frequency level sound may be an indicator for determining whether left earpiece 104 and/or right earpiece 108 is disposed in a user's ears.

In an example, microphone detector 112 may comprise, a high-pass filter 424. In an example test, high-pass filter 424 may receive a first test input signal from right microphone 118. High-pass filter 424 may generate a first high-pass signal based at least in part on the first test input signal. High-pass filter 424 may receive a second test input signal from left microphone 120. High-pass filter 424 may generate a second high-pass signal based at least in part on the second test input signal. In another example, the first test input signal may be sent to the high-pass filter 424 from the left microphone 120 and the second test input signal may be sent from the right microphone 118. In an example, selection of a cut-off frequency for high-pass filter 424 may depend on earphones 102 style and materials. For example, if earphones 102 comprise high quality eartips with good noise suppression capabilities, a cut-off frequency may be 500 Hz. In another example, a cut-off frequency may be in a range of about 0 Hz-20,000 Hz.

In an example, a squarer circuit 426 may be coupled to high-pass filter 424 and may be configured to receive and measure the first high-pass signal from the high-pass filter 424 and then square the first high-pass signal to provide the measurement of the first high-frequency level. Squarer circuit 426 may receive and measure the second high-pass signal from high-pass filter 424 and then square the second high-pass signal to provide the measurement of the second high-frequency level. Squarer circuit 426 may generate a first measurement value of the first high-pass signal and a second measurement value of the second high-pass signal.

In an example, a buffer 428 may be coupled to be in communication with squarer circuit 426. Squarer circuit 426 may send the first and second measurements to buffer 428. Buffer 428 may be configured to store at least one of the first measurement value or the second measurement value.

In an example, a comparator 422 may be coupled to be in communication with at least one of buffer 428 or squarer circuit 426. Comparator 422 may receive the first measurement value and the second measurement value from either or both of squarer circuit 426 or buffer 428. Comparator 422 may be configured to compare the first measurement value and the second measurement value and to provide a comparison signal.

In an example, a repurpose controller 430 may be coupled to be in communication with comparator 422 and may be configured to receive the comparison signal and to provide an indication that at least one of the right earpiece 108 or the left earpiece 104 is to be repurposed as the microphone.

Repurpose controller 430 may be further configured to repurpose the right earpiece 108 as the microphone if the measurement of the second high-frequency level is greater than the measurement of the first high-frequency level or repurpose the left earpiece 104 as the microphone if the measurement of the first high-frequency level is greater than the measurement of the second high-frequency level.

Figure 5B:
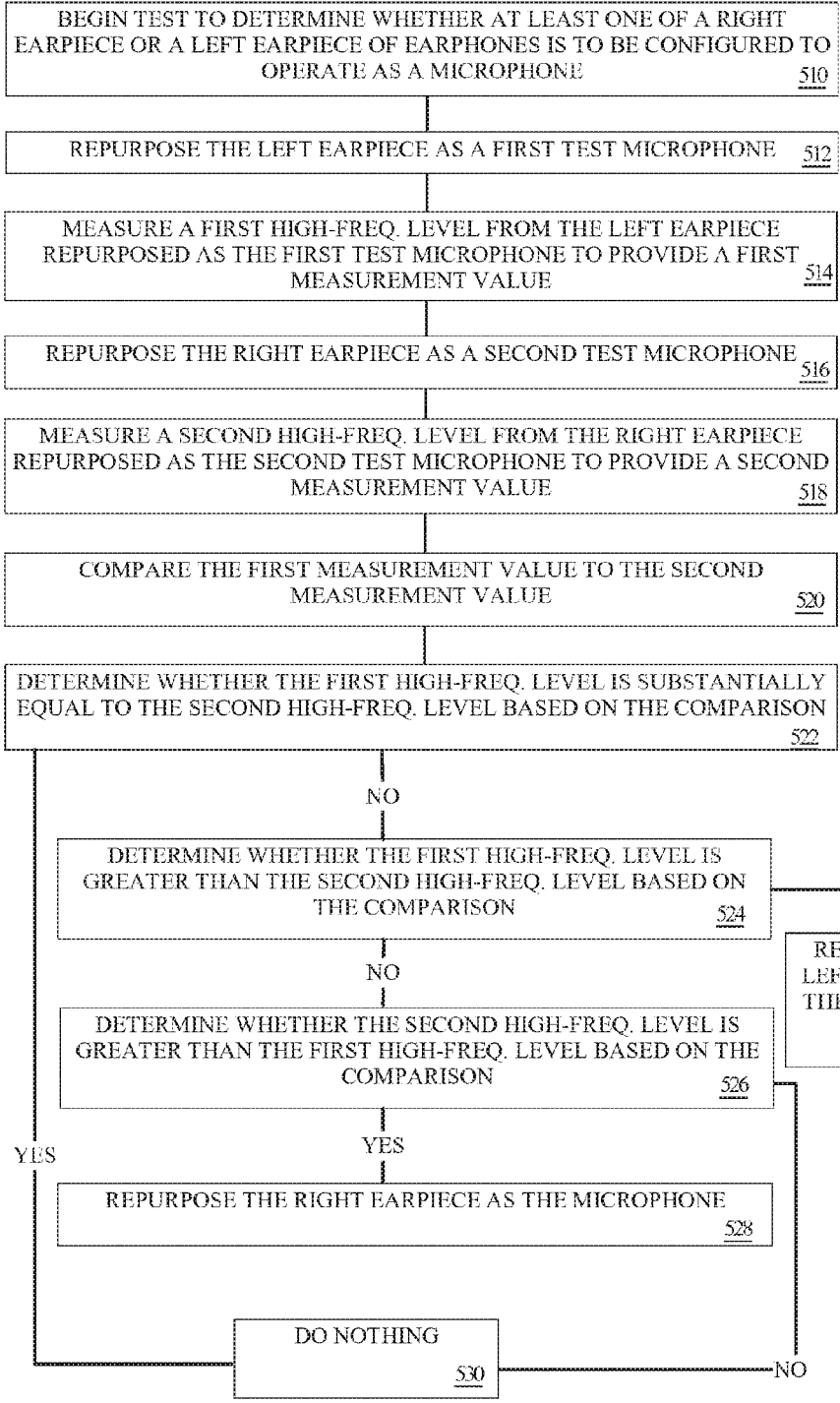
FIG. 5B illustrates a process to repurpose a speaker and/or microphone.

FIGS. 5A-5B illustrate a process to repurpose a speaker and/or microphone, and more specifically, FIGS. 5A-5B illustrate flow charts of example processes 500 and 508 respectively arranged to repurpose a speaker as a microphone in accordance with at least some examples of the present disclosure. These figures employ block diagrams to illustrate the example processes detailed therein. These block diagrams may set out various functional blocks or actions that may be described as processing operations, functional operations, events and/or acts, etc., and may be performed by hardware, software, firmware, and/or combination thereof, and need not necessarily be performed in the exact order shown. Numerous alternatives or additions to the functional blocks detailed (and/or combinations thereof) may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described and other rearrangements, substitutions changes, modifications, etc., may be made without departing from the scope of claimed subject matter.

Additionally, FIGS. 5A and 5B are described with reference to elements depicted in FIGS. 1, 2, 3 and 4. However, the described examples are not limited to these depictions. More specifically, some elements depicted in FIGS. 1, 2, 3 and 4 may be omitted from example implementations of the processes detailed herein. Additionally, other elements not depicted in FIGS. 1, 2, 3 and 4 may be used to implement example processes.

Turning now to process 500 and FIG. 5A, briefly stated, process 500 may be carried out by any of repurpose module 114 or 314, microphone detector 112 or 312, sensor monitor 322 and/or a different or additional processor. Although any one of the noted devices may carry out the process 500, illustrative examples are provided, which reference microphone detector 112 and repurpose module 114 carrying out process 500, for the sake of ease of explanation. However, this distinction is not intended to be limiting.

Beginning at operation 502, "Determine At Least One Of A Right Earpiece Or A Left Earpiece Of A Set Of Earphones Is To Be Configured To Function As A Microphone," microphone detector 112 may include logic and/or features configured to determine whether at least one of right earpiece 108 or left earpiece 104 of earphones 102 is to be configured to operate as a microphone.

Continuing to operation 504, "Provide An Indication That At Least One Of The Right Earpiece Or The Left Earpiece Is To Be Repurposed As A Microphone," microphone detector 112 may include logic and/or features configured to provide an indication to repurpose module 114 that at least one of right earpiece 108 or left earpiece 104 is to be repurposed as a microphone.

Continuing to operation 506, "Repurpose At Least One Of The Right Earpiece Or The Left Earpiece As A Microphone Based On The Indication," repurpose module 114 may include logic and/or features configured to repurpose at least one of the right earpiece 108 or the left earpiece 104 as a microphone based on the indication. To perform the repurpose in one embodiment, configuration/reconfiguration of input/output terminals within the repurpose module 114, such as described above with respect to FIG. 1, FIG. 2, etc., may be performed.

Turning now to process 508 and FIG. 5B, briefly stated, process 508 is arranged to detect indicia that indicate whether to repurpose a speaker as a microphone and/or a microphone as a speaker. Process 508 may be carried out by any of repurpose module 114 or 314, microphone detector 112 or 312, sensor monitor 322 and/or a different or additional processor. Although any one of the noted devices may carry out the process 508, illustrative examples are provided, which reference microphone detector 112 and repurpose module 114 carrying out process 508, for the sake of ease of explanation. However, this distinction is not intended to be limiting.

Beginning at operation 510, "Begin Test To Determine Whether At Least One Of A Right Earpiece Or A Left Earpiece Of Earphones Is To Be Configured To Operate As A Microphone," where microphone detector 112 may include logic and/or features configured to begin a test to determine whether at least one of a right earpiece 108 or a left earpiece 104 of earphones 102 is to be configured to operate as a microphone.

Continuing to operation 512, "Repurpose The Left Earpiece As A First Test Microphone," where microphone detector 112 may include logic and/or features configured to send a signal or command to repurpose module 114 to repurpose the left earpiece 104 as a first test microphone. Responsive to the signal or command, repurpose module 114 may repurpose left earpiece 104 as a first test microphone.

Moving to operation 514, "Measure A First High-Frequency Level From The Left Earpiece Repurposed As The First Test Microphone To Provide A First Measurement Value," where microphone detector 112 may include logic and/or features configured to measure a first high-frequency level from the left earpiece 104 repurposed as the first test microphone to provide or generate a measurement value of the first high-frequency level.

Continuing to operation 516, "Repurpose The Right Earpiece As A Second Test Microphone," where microphone detector 112 may include logic and/or features configured to send a signal or command to repurpose module 114 to repurpose right earpiece 108 as a second test microphone. Responsive to the signal or command, repurpose module 114 may repurpose right earpiece 108 as a first test microphone.

Moving to operation 518, "Measure A Second High-Frequency Level From The Right Earpiece Repurposed As The Second Test Microphone To Provide A Second Measurement Value," where microphone detector 112 may include logic and/or features configured to measure a second high-frequency level from the right earpiece 108 repurposed as the second test microphone to provide or generate a measurement value of the second high-frequency level.

Continuing to operation 520, "Compare The First Measurement Value To The Second Measurement Value," where microphone detector 112 may include logic and/or features configured to compare the first measurement value of the first high-frequency level to the second measurement value of the second high-frequency level. The first measurement value and the second measurement values may be stored in memory, a table, a database and/or other storage unit or a combination thereof.

At operation 522, "Determine Whether The First High-Freq. Level is Substantially Equal To The Second High-Freq. Level Based On The Comparison," where microphone detector 112 may include logic and/or features configured to determine, based on the comparison, whether the first high-frequency level is substantially equal to the second high-frequency level. If the first high-frequency level is substantially equal to the second high-frequency level the process may proceed to operation 530, "Do Nothing" where the process ends.

Else, the process may proceed to operation 524, "Determine Whether The First High-Freq. Level Is Greater Than The Second High-Freq. Level Based On The Comparison," where microphone detector 112 may include logic and/or features configured to determine, based on the comparison, whether the first high-frequency level is greater than the second high-frequency level.

If the first high-frequency level is greater than the second high-frequency level the process may proceed to operation 532. At operation 532, "Repurpose The Left Earpiece As The Microphone," repurpose module 114 may include logic and/or features configured to repurpose left earpiece 104 as left microphone 120.

Else, the process may proceed to operation 526, "Determine Whether The Second High-Frequency Level Is Greater Than The First High-Frequency Level Based On The Comparison," where microphone detector 112 may include logic and/or features configured to determine, based on the comparison, whether the second high-frequency level is greater than the first high-frequency level. If the second high-frequency level is not greater than the first high-frequency level the process may proceed to operation 530, "Do Nothing," where the process may end for any of a variety of reasons.

If the second high-frequency level is greater than the first high-frequency level the process may proceed to operation 528. At operation 528, "Repurpose The Right Earpiece As The Microphone," repurpose module 314 may include logic and/or features configured to repurpose the right earpiece 108 as right microphone 118 if the second high-frequency level measurement value is greater than the first high-frequency level measurement value.

FIG. 6 is a block diagram illustrating one example of a computer program product 600 to repurpose a speaker and/or microphone, arranged in accordance with at least some embodiments described herein. As depicted, computer program product 600 may include a machine-readable non-transitory medium having stored therein instructions that, in response to execution, cause a device to repurpose a dual speaker and microphone of an earpiece. Computer program product 600 may include a signal bearing medium 602. Signal bearing medium 602 may include one or more machine-readable instructions 604, which, when executed by one or more processors, may operatively enable a computing device to provide the functionality described herein. In various examples, the devices discussed herein may use some or all of the machine-readable instructions.

In one example, the machine-readable instructions 604 may include monitoring sensor data associated with the earpiece, detecting a repurpose event based on the sensor data, and determining if the dual speaker and microphone is to be repurposed as a speaker or microphone based on the detected repurpose event. In some examples, the machine-readable instructions 604 may include repurposing the dual speaker and microphone based on detected repurpose event.

In one example, signal bearing medium 602 may encompass a computer-readable medium 606, such as, but not limited to, a hard disk drive (HDD), a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.). In some examples, signal bearing medium 602 may encompass a machine readable non-transitory medium.

In general, the apparatus and process described with respect to FIGS. 1-6, and elsewhere herein may be implemented in any suitable server and/or computing system. Example systems may be described with respect to FIG. 7 and elsewhere herein. In general, the computer system may be configured to determine, in response to an event requiring the microphone capability, at least one of a right earpiece 108 or a left earpiece 104 of earphones 102 is to be configured to provide the microphone capability and repurpose at least one of the right earpiece 108 or the left earpiece 104 as a microphone based at least in part on the determination.

Figure 7:
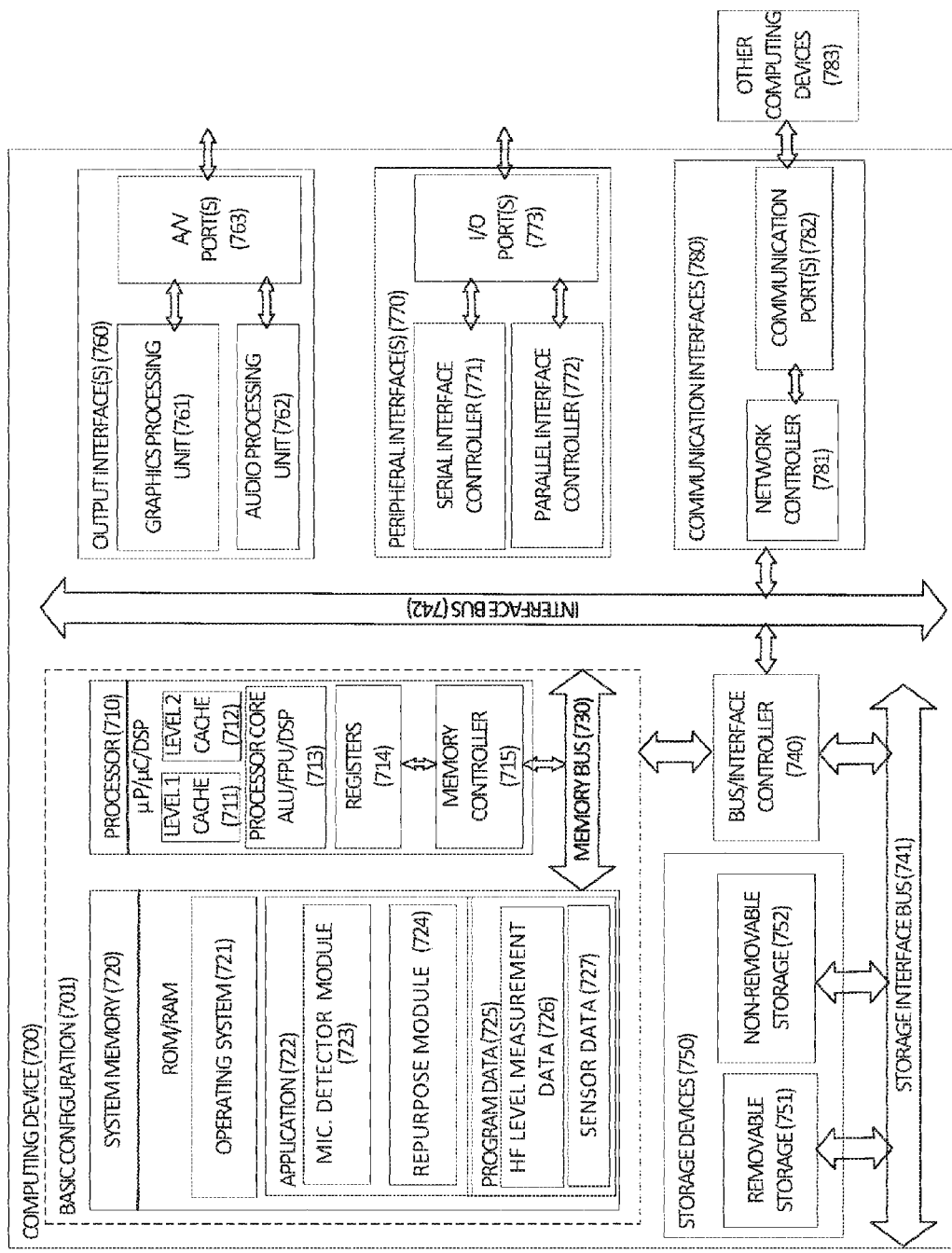
FIG. 7 illustrates a block diagram of an example computing device, all arranged in accordance with at least some embodiments described herein.

FIG. 7 is a block diagram illustrating an example of a computing device 700, arranged in accordance with at least some embodiments of the present disclosure. In various examples, computing device 700 may be configured to facilitate repurposing a speaker as a microphone as discussed herein. For example, in one embodiment, computing device 700 (or components thereof) may be used to implement devices 150, 200, and 350 described above. In one example of a basic configuration 701, computing device 700 may include one or more processors 710 and a system memory 720. A memory bus 730 can be used to communicate between one or more processors 710 and system memory 720.

Depending on the desired configuration, one or more processors 710 may be of any type including but not limited to a microprocessor (μP), a microcontroller (μC), a digital signal processor (DSP), or any combination thereof. One or more processors 710 may include one or more levels of caching such as a level one cache 711 and a level two cache 712, a processor core 713, and registers 714. Processor core 713 can include an arithmetic logic unit (ALU), a floating point unit (FPU), a digital signal processing core (DSP Core), or any combination thereof. A memory controller 715 can also be used with one or more processors 710, or in some implementations memory controller 715 can be an internal part of processor 710.

Depending on the desired configuration, system memory 720 may be of any type including hut not limited to volatile memory (such as RAM), non-volatile memory (such as ROM, flash memory, etc.) or any combination thereof. System memory 720 may include an operating system 721, one or more applications 722, and program data 725. One or more applications 722 may include a microphone detector module 723 and/or repurpose module 724 that may be arranged to perform the actions, and/or operations as described herein including the blocks, actions, and/or operations configured to facilitate repurposing a speaker as a microphone or a microphone as a speaker as described herein. For example, repurpose module 724 may be used to implement repurpose module 114 shown and described previously above. As another example, microphone detector module 723 may be used to implement or control operation of microphone detector module 112 or 312 shown and described previously above. Program data 725 may include, among other data, high-frequency level measurement data 726 and/or sensor data 727 or other data or combinations thereof. High-frequency level measurement data 726 and/or sensor data 727 may be used by microphone detector module 723 module and/or repurpose module 724, as described herein. In some examples, one or more applications 722 may be arranged to operate with program data 725 on operating system 721. This described basic configuration 701 is illustrated in FIG. 7 by those components within dashed line.

The computing device 700 may have additional features or functionality, and additional interfaces to facilitate communications between basic configuration 701 and any required devices and interfaces. For example, a bus/interface controller 740 may be used to facilitate communications between basic configuration 701 and one or more data storage devices 750 via a storage interface bus 741. One or more data storage devices 750 may be removable storage devices 751, non-removable storage devices 752, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data. System memory 720, removable storage 751 and non-removable storage 752 are all examples of computer storage media. The computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

The computing device 700 may also include an interface bus 742 for facilitating communication from various interface devices (e.g., output interfaces, peripheral interfaces, and communication interfaces) to basic configuration 701 via bus/interface controller 740. Example output interfaces 760 may include a graphics processing unit 761 and an audio processing unit 762, which may be configured to communicate to various external devices such as a display or speakers via one or more A/V ports 763. Example peripheral interfaces 770 may include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which may be arranged to facilitate communications with one or more other computing devices 783 over a network communication via one or more communication ports 782. A communication connection is one example of a communication media. In one embodiment, earphones 102 may be coupled to computing device 700 via any one or more of ports 763, 773, or 782. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

The computing device 700 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 700 may also be implemented as a personal computer including both laptop computer and non-laptop computer configurations. In addition, computing device 700 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating" "determining" or the like refer to actions or processes of a computing device, that manipulates or transforms data represented as physical electronic or magnetic quantities within memories, registers, or other information storage devices, transmission devices, or display devices of the computing device.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

The use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors, firmware, or as virtually any combination thereof, and that designing the circuitry and/or writing the code for the software and or firmware would be well within the skill of one of skill in the art in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback to sense position and/or velocity; control motors to move and/or adjust components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an example," "one example," "some examples," or "other examples" may mean that a particular feature, structure, or characteristic described in connection with one or more examples may be included in at least some examples, but not necessarily in all examples. The various appearances of "an example," "one example," or "some examples" in the preceding description are not necessarily all referring to the same example.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for a device to provide a microphone capability at earphones, the method comprising:
    determining, in response to an event associated with the microphone capability, that at least one of a first earpiece of the earphones or a second earpiece of the earphones is to be configured to provide the microphone capability; and
    repurposing the at least one of the first earpiece of the earphones or the second earpiece of the earphones as a microphone based at least, in part, on the determination,
    wherein determining that the at least one of the first earpiece of the earphones or the second earpiece of the earphones is to be configured to provide the microphone capability comprises:
        repurposing the second earpiece of the earphones as a first test microphone;
        measuring a first high-frequency level from the second earpiece of the earphones repurposed as the first test microphone to provide a first measurement value of the first high-frequency level;
        repurposing the first earpiece of the earphones as a second test microphone;
        measuring a second high-frequency level from the first earpiece of the earphones repurposed as the second test microphone to provide a second measurement value of the second high-frequency level;
        comparing the first measurement value with the second measurement value; and
        repurposing the first earpiece of the earphones as the microphone in response to the comparison being indicative that the second high-frequency level is greater than the first high-frequency level, or repurposing the second earpiece of the earphones as the microphone in response to the comparison being indicative that the first high-frequency level is greater than the second high-frequency level.

2. The method of claim 1, wherein measuring the first high-frequency level from the second earpiece of the earphones repurposed as the first test microphone comprises:
    passing an input signal associated with the second earpiece of the earphones repurposed as the first test microphone through a high-pass filter to provide a first high-pass signal; and
    squaring the first high-pass signal to provide the first measurement value of the first high-frequency level.

3. The method of claim 1, wherein determining, in response to the event includes determining, in response to an event that comprises at least one of receiving an incoming call at the device, making an outgoing call from the device, detecting a typed text string at the device, detecting a voice command and/or other user input at the device, or a combination thereof.

4. The method of claim 1, wherein determining, in response to the event includes determining, in response to an event that causes an interruption of the device providing audio via the earphones.

5. The method of claim 1, wherein determining, in response to the event includes determining, in response to an event that comprises the at least one of the first earpiece of the earphones or the second earpiece of the earphones being moved.

6. The method of claim 1, wherein determining that the at least one of the first earpiece of the earphones or the second earpiece of the earphones is to be configured to provide the microphone capability comprises detecting sensor data from at least one of a first sensor of the first earpiece or a second sensor of the second earpiece and/or a repurpose signal from a sensor monitor.

7. The method of claim 6, wherein detecting the sensor data from the first sensor of the first earpiece comprises detecting the sensor data from at least one of an accelerometer, a thermal sensor, an acoustic sensor, an optical sensor, a light detector, a proximity sensor, a pressure sensor, a current sensor, a physical switch, or a combination thereof.

8. The method of claim 1, further comprising:
determining, in response to the event associated with the microphone capability and prior to determining that the at least one of the first earpiece of the earphones or the second earpiece of the earphones is to be configured to provide the microphone capability, whether the earphones are in use by the device; and
in response to a determination that the earphones are not in use by the device, using a device microphone of the device for the event.

9. An apparatus comprising:
a device configured to be coupled to audio earphones;
a microphone detector of the device configured to:
determine that at least one of a first earpiece of the audio earphones or a second earpiece of the audio earphones is to be configured to provide a microphone capability, in response to an event associated with the microphone capability; and
provide an indication that the at least one of the first earpiece of the audio earphones or the second earpiece of the audio earphones is to be repurposed as a microphone that includes the microphone capability; and
a repurpose module of the device communicatively coupled to the microphone detector and configured to repurpose the at least one of the first earpiece of the audio earphones or the second earpiece of the audio earphones as the microphone based on the indication, wherein the microphone detector includes:
a high-pass filter configured to:
detect a first input signal from the second earpiece of the audio earphones, wherein the second earpiece of the audio earphones is repurposed as a first test microphone;
provide a first high-pass signal based at least, in part, on the first input signal;
detect a second input signal from the first earpiece of the audio earphones, wherein the first earpiece of the audio earphones is repurposed as a second test microphone; and
provide a second high-pass signal based at least, in part, on the second input signal;
a squarer circuit coupled to the high-pass filter, and configured to:
detect the first high-pass signal from the high-pass filter;
provide a first measurement value of the first high-pass signal;
detect the second high-pass signal from the high-pass filter; and
provide a second measurement value of the second high-pass signal;
a buffer coupled to the squarer circuit, and configured to store at least one of the first measurement value or the second measurement value;
a level comparator coupled to the buffer and to the squarer circuit, and configured to:
compare the first measurement value and the second measurement value; and
provide a comparison signal based on the comparison of the first measurement value and the second measurement value; and
a repurpose controller coupled to the level comparator, and configured to:
detect the comparison signal; and
based on the comparison signal, provide the indication that the at least one of the first earpiece of the audio earphones and the second earpiece of the audio earphones is to be repurposed as the microphone.

10. The apparatus of claim 9, further comprising an audio chip of the device that includes the microphone detector.

11. The apparatus of claim 9, further comprising an audio chip of the device that includes the repurpose module, wherein the microphone detector is provided off the audio chip of the device.

12. The apparatus of claim 9, wherein the microphone detector comprises:
an input terminal configured to receive a first signal from a first sensor of the first earpiece or a second signal from a second sensor of the second earpiece; and
an output terminal configured to provide the indication that the at least one of the first earpiece of the audio earphones or the second earpiece of the audio earphones is to be repurposed as the microphone based at least, in part, on detection of the first signal or the second signal received at the input terminal.

13. The apparatus of claim 9, wherein the device comprises at least one of a personal computer, mobile phone, radio, or a tablet device.

14. The apparatus of claim 9, wherein the device is configured to be coupled to the audio earphones by at least one of a wired connection or a wireless connection.

15. A machine readable non-transitory medium that stores executable instructions that, in response to execution, cause a device to repurpose at least one of a first earpiece of earphones or a second earpiece of the earphones by performance of or control of performance of operations to:
monitor sensor data associated with the at least one of the first earpiece of the earphones or the second earpiece of the earphones;
detect a repurpose event based on the monitored sensor data;
determine that the at least one of a first earpiece of the earphones or a second earpiece of the earphones is to be repurposed as a microphone, based on the detected repurpose event; and
repurpose the at least one of the first earpiece of the earphones or the second earpiece of the earphones as a microphone based at least, in part, on the determination, wherein the determination includes operations to:
repurpose the second earpiece of the earphones as a first test microphone;
measure a first high-frequency level from the second earpiece of the earphones repurposed as the first test microphone to provide a first measurement value of the first high-frequency level;
repurpose the first earpiece of the earphones as a second test microphone;
measure a second high-frequency level from the first earpiece of the earphones repurposed as the second test microphone to provide a second measurement value of the second high-frequency level;
compare the first measurement value with the second measurement value; and
repurpose the first earpiece of the earphones as the microphone in response to the comparison being indicative that the second high-frequency level is greater than the first high-frequency level, or repurpose the second earpiece of the earphones as the microphone in response to the comparison being indicative that the first high-frequency level is greater than the second high-frequency level.

16. The machine readable non-transitory medium of claim 15, wherein the operations to monitor the sensor data include at least one operation to obtain the sensor data from at least one of a first sensor of a right earpiece of the earphones or a second sensor of a left earpiece.

17. The machine readable non-transitory medium of claim 15, wherein the instructions to repurpose the at least one of the first earpiece of the earphones or the second earpiece of the earphones as the microphone include at least one instruction to generate a repurpose signal based on the determination.

* * * * *

UNITED STATES PATENT AND TRADEMARK OFFICE
CERTIFICATE OF CORRECTION

PATENT NO. : 9,794,671 B2
APPLICATION NO. : 15/110466
DATED : October 17, 2017
INVENTOR(S) : Kim et al.

Page 1 of 2

It is certified that error appears in the above-identified patent and that said Letters Patent is hereby corrected as shown below:

On the Title Page

In Item (71), under "Applicant", in Column 1, Lines 1-3, delete "EMPIRE TECHNOLOGY DEVELOPMENT LLC, WILMINGTON (DE)" and insert -- EMPIRE TECHNOLOGY DEVELOPMENT LLC, WILMINGTON, DE (US) --, therefor.

In the Specification

In Column 1, Line 33, delete "determining in" and insert -- determining, in --, therefor.

In Column 3, Line 47, delete "(UNITS)," and insert -- (UMTS), --, therefor.

In Column 4, Line 26, delete "activity a" and insert -- activity or a --, therefor.

In Column 12, Line 9, delete "R DVDs," and insert -- R/W DWDs, --, therefor.

In Column 12, Line 47, delete "caching such" and insert -- caching, such --, therefor.

In Column 12, Line 56, delete "hut" and insert -- but --, therefor.

In Column 14, Line 51, delete ""calculating"" and insert -- "calculating," --, therefor.

In Column 15, Lines 49-50, delete "microprocessors, firmware," and insert -- microprocessors), as firmware, --, therefor.

In Column 17, Line 23, delete "and/or B," and insert -- "and/or A, B, --, therefor.

Signed and Sealed this
Twenty-fourth Day of April, 2018

Andrei Iancu
*Director of the United States Patent and Trademark Office*

CERTIFICATE OF CORRECTION (continued)
U.S. Pat. No. 9,794,671 B2

In the Claims

In Column 19, Line 13, in Claim 9, delete "apparatus comprising:" and insert -- apparatus, comprising: --, therefor.